UNITED STATES PATENT OFFICE.

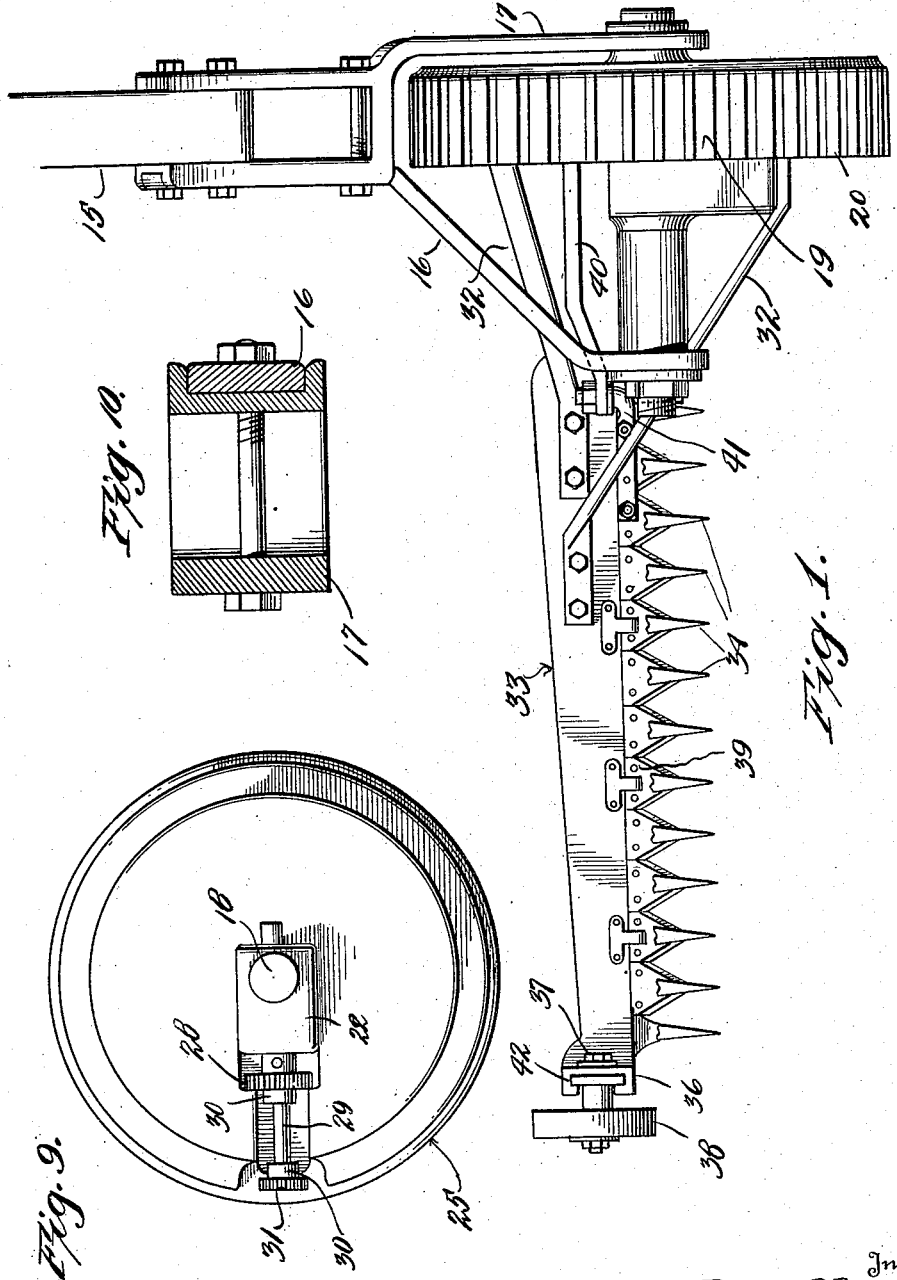

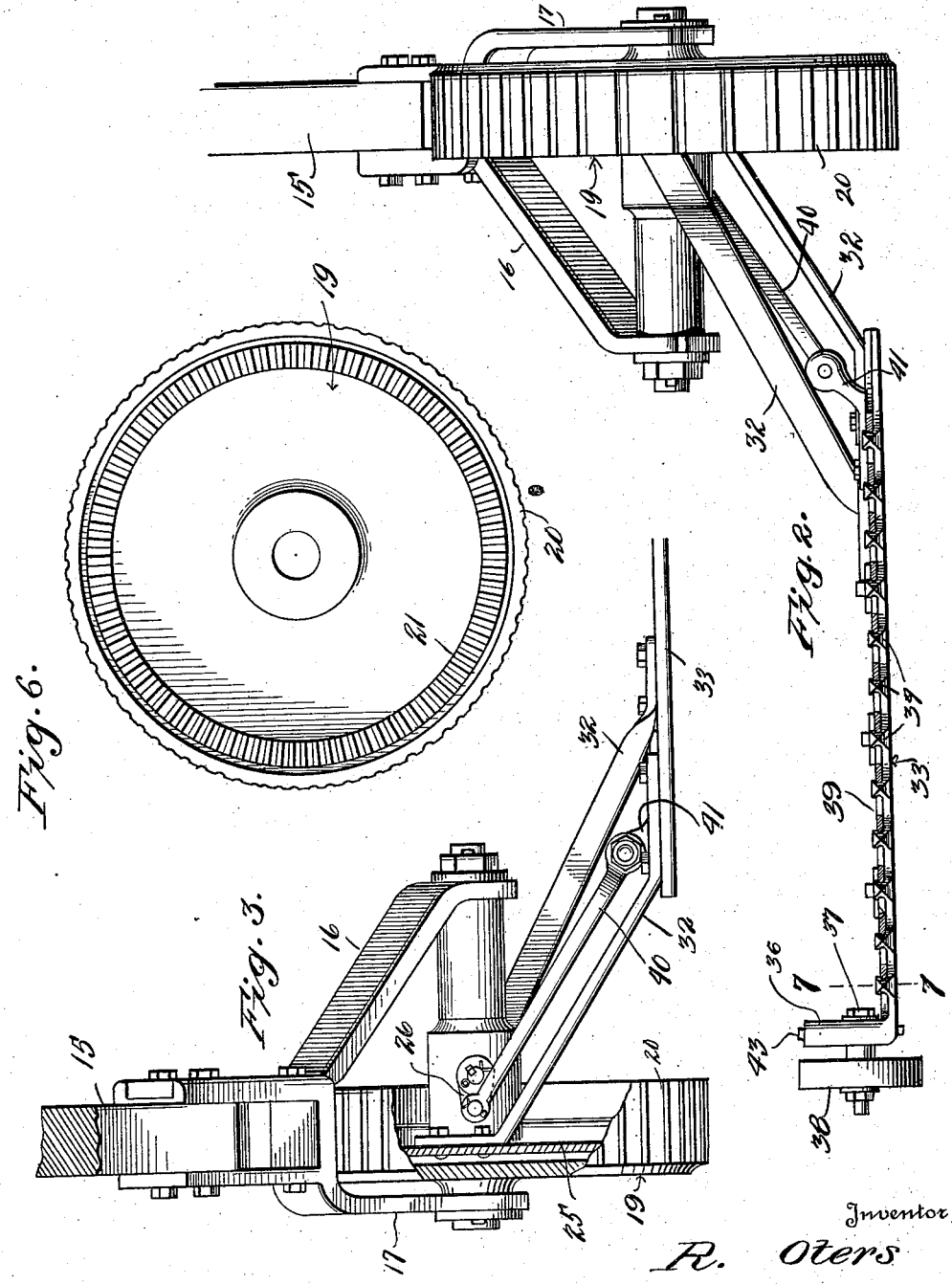

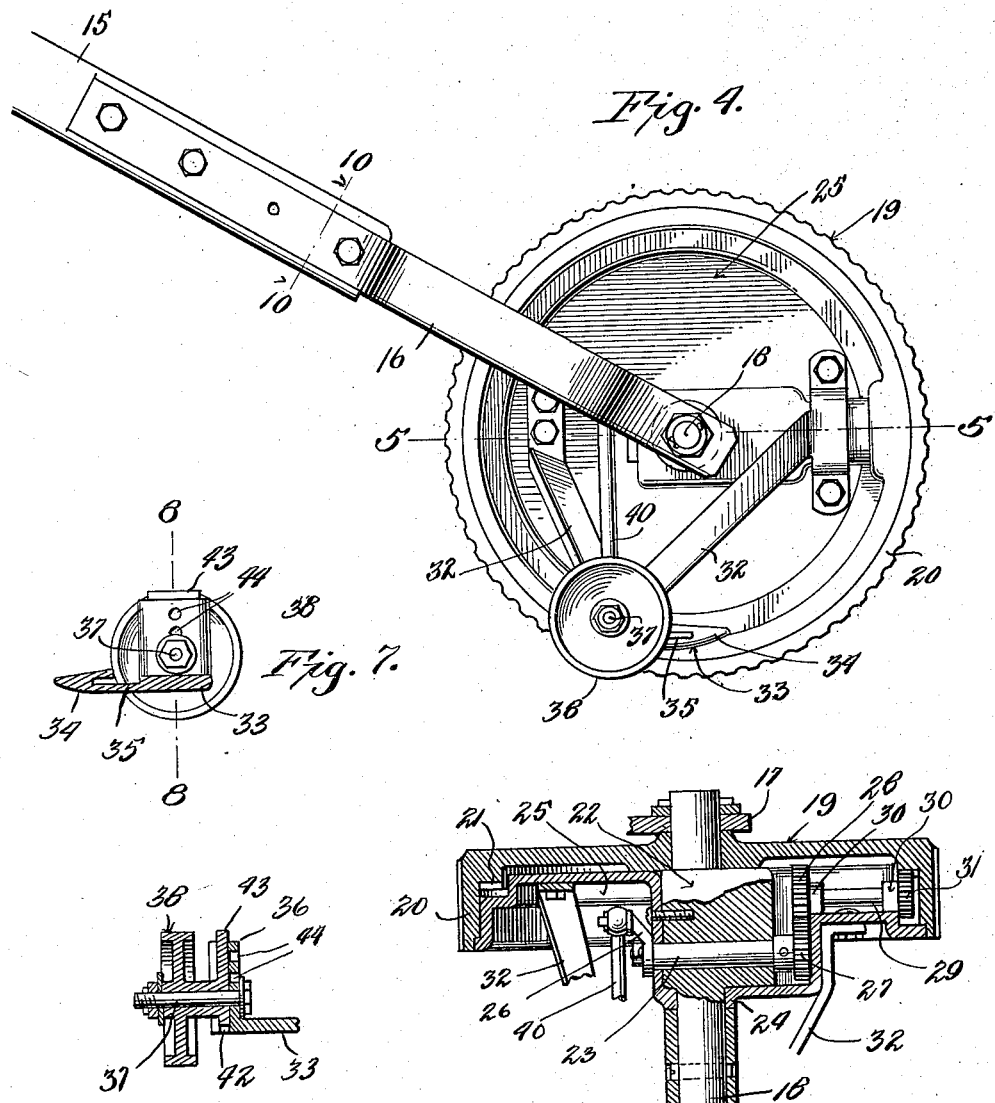

RICHARD OTERS, OF OSSINING, NEW YORK.

LAWN-MOWER.

1,166,474.   Specification of Letters Patent.   Patented Jan. 4, 1916.

Application filed March 30, 1914.  Serial No. 828,315.

*To all whom it may concern:*

Be it known that I, RICHARD OTERS, a citizen of the United States, residing at Ossining, in the county of Westchester, State of New York, have invented certain new and useful Improvements in Lawn-Mowers; and I do hereby declare the following to be a full, clear, and exact description of the invention, such as will enable others skilled in the art to which it appertains to make and use the same.

This invention relates to lawn mowers.

The object of the invention resides in the provision of a lawn mower embodying an improved simplified construction, and which will be durable and efficient in use.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a plan view of a lawn mower constructed in accordance with the invention; Fig. 2, a front view of the lawn mower; Fig. 3, a rear view partly broken away and partly in section; Fig. 4, a side view of the lawn mower; Fig. 5, a section on the line 5—5 of Fig. 4; Fig. 6, a view of the large traction wheel of the lawn mower looking at the inner side of said wheel; Fig. 7, a section on the line 7—7 of Fig. 2; Fig. 8, a section on the line 8—8 of Fig. 7; Fig. 9, a view of the disk which is fixed on the axle of the lawn mower and looking at the inner side thereof, and Fig. 10, a transverse section through the handle of the lawn mower.

Referring to the drawings the improved lawn mower is shown as comprising a handle 15 which has adjustably secured thereto bracket arms 16 and 17. Mounted in the free ends of the arms 16 and 17 is an axle 18 upon which is rotatably mounted a traction wheel 19 having an inwardly directed peripheral flange 20 and formed on the inner side of said traction wheel is an annular rack 21. The axle 18 is provided with an enlarged central portion 22 in which is rotatably mounted a transverse shaft 23. Fixed on the axle 18 is a sleeve 24 the outer end of which terminates in a disk 25 confined substantially within the peripheral flange 20, it being noted that the shaft 23 extends through the sleeve 24 at one end. Fixed on the end of the shaft 23 disposed exteriorly of the sleeve 24 is a crank arm 26 for a purpose that will presently appear. Fixed on the end of the shaft 23 confined within the sleeve 24 is a gear 27 which meshes with a gear 28 fixed on a shaft 29 rotatably mounted in bearings 30 carried on the inner side of the disk 25. Also fixed on the shaft 29 is a gear 31 which meshes with the rack 21. Supported from the disk 25 by means of bracket arms 32 is a guard bar 33 provided with the usual guard fingers 34 and having a longitudinal groove 35 in its upper side. The end of the bar 33 remote from the disk 25 is provided with an upturned portion 36 through which is transversely engaged a bolt 37 and rotatably mounted on this bolt is a small traction wheel 38 which serves to support the outer end of said bar as will be obvious. Slidably mounted in the groove 35 is a sickle bar 39 which is adapted to be reciprocated through the medium of a pitman 40 one end of which is connected to a heel 41 formed on the sickle bar and the other end to the crank arm 26.

It will be noted that the upturned end 36 of the bar 33 is provided on its outer side with a groove 42 in which is slidably engaged an extension 43 of the hub of the wheel 38. The upturned end 36 is provided with a plurality of openings 44 in which the bolt 37 is adapted to be interchangeably engaged and whereby the wheel 38 may be adjusted vertically.

By this construction it will be obvious that as the device moves along the ground the wheel 19 will be rotated and this rotation of said wheels will effect a rotation of the shafts 29 and 23 through the medium of the various connections heretofore referred to. The rotation of the shaft 23 will in turn through the medium of the crank arm 26 and pitman 40 effect the necessary reciprocation of the sickle bar 39.

What is claimed is:—

In a lawn mower, the combination of a handle, bracket arms secured to said handle, an axle having its ends supported by said bracket arms respectively, a traction wheel rotatably mounted on the axle and having a laterally directed peripheral flange suitably stepped on its under side to form shoulders, an annular rack formed on one of said shoulders, a disk fixed on said axle and provided with a peripheral flange forming a bearing for the peripheral flange of the traction wheel, a shaft rotatably mounted on said disk, a pinion fixed on said shaft and meshing with said rack, a second shaft rotatably mounted in the axle, connection between the first and second shafts, a crank arm on the second shaft, a guard bar supported from the axle, a sickle bar mounted for reciprocation on the guard bar, and a pitman connecting the sickle bar and said crank arm.

In testimony whereof, I affix my signature, in the presence of two witnesses.

RICHARD OTERS.

Witnesses:
CHARLES LEARY,
THOS. LEARY.

Copies of this patent may be obtained for five cents each, by addressing the "Commissioner of Patents, Washington, D. C."